March 22, 1966 J. M. NEMTSOV 3,241,336
UNIVERSAL JOINT
Filed Aug. 12, 1963

3,241,336
UNIVERSAL JOINT
Juri Mitrofanovich Nemtsov, Moscow, U.S.S.R., assignor to Moskovsky savod malolitrazhnykh Avtomobilei
Filed Aug. 12, 1963, Ser. No. 301,457
1 Claim. (Cl. 64—17)

The present invention relates to universal joints and more particularly to motor vehicle universal joints.

A universal joint is known which constantly operates in mud, moisture and dust, and therefore requires adequate protection for its bearings from foreign matter, because the durability of the bearings and the cross trunnions largely depends on the quality of the sealing. In current use are universal joints whose cross trunnions are provided with metal cup-shaped bearings having plastic bushings. Types of sealing in present use in such bearings for a universal joint are manufactured as felt rings, cork rings or combined units comprising a felt ring and a rubber oil seal. The known types of sealing arrangements are disadvantageous in so far as the same are complicated in design and unreliable in operation. The utilization thereof often causes an untimely breakdown of the bearings and of the cross trunnions, due to foreign matter in the bearings. Moreover, the manufacture of such sealing arrangements requires an appreciable amount of metal, rubber and felt, and the mounting thereof requires considerable labor.

An object of the present invention is to overcome the above-mentioned disadvantages by providing a simple and reliable means.

For achieving the above object, there is provided a joint structure which is distinct from the existing devices in that the ends of the plastic bushings project beyond the ends of the cups and overlap the clearance between the ends of such cups and the cross.

The present elongated plastic bushing allows a substantial change of the structural characteristics of the universal joint and the simplification of the manufacture of the bearing and cross per se by obviating additional seats, grooves, et cetera for the reception of the sealing means.

Moreover, in order to minimize the utilization of metal, felt and rubber, the requisite sealing is accomplished by means of an elongated bushing while in very hard operating conditions, an additional sealing may be realized by the use of a plastic ring.

Additional objects and advantages of the invention will become more readily apparent to one skilled in the art from the following detailed description and annexed drawings, in which drawings.

Figure 1:
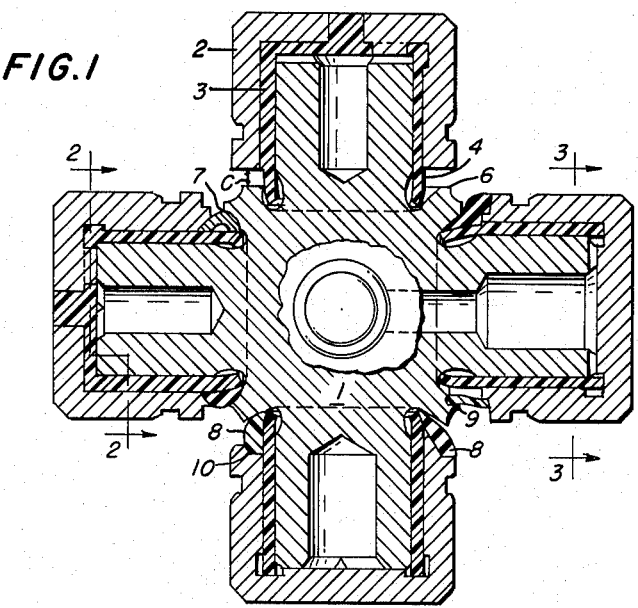
FIG. 1 is a sectional view of the universal joint of the present invention.

The universal joint comprises yokes, bearings and a cross 1. The universal joint bearings are constituted by metal cups 2 provided with pressed-in or molded bushings 3 of polyamide or other antifriction plastic material.

The ends 4 of the bushings project beyond end faces 5 of the cups and overlap the clearance "C" between the ends of the cups 2 and face 6 of the cross 1. The cross journals are provided with circular recesses to house the projecting ends of the bushings.

Under very hard operating conditions the universal joint may be provided with additional seal components 8 shaped as rubber or plastic rings. For mounting the rings, the cross is provided with special hollows 9 and the cup with inclined surfaces 10.

Figure 2:
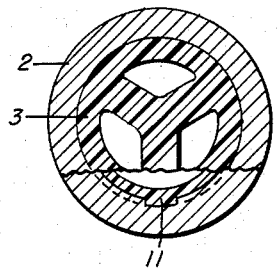
FIG. 2 is a sectional view taken along the line 1—1 of FIG. 1.

FIG. 2 shows a slide bearing manufactured from antifriction plastic molded in a cup 2. The bearing is cross-shaped along the section line 1—1 and the periphery of the bushing 3 is formed with slots 11 engaging the circular grooves of the cup 2.

Figure 3:
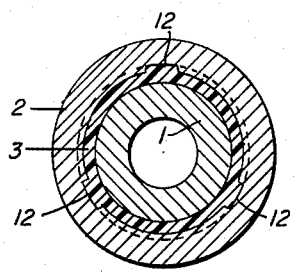
FIG. 3 is a sectional view taken along the line 2—2 of FIG. 1.

FIG. 3 shows a slide bearing which is an antifriction plastic bushing 3, with or without slots 12, pressed into the cup 2. A bushing without slots may be alternatively pressed into a cup without grooves.

The present specification and the drawings explain the preferable embodiment of the invention, but it will be apparent to those skilled in the art that modifications and variants may occur within the invention without departing from the spirit or scope of the invention and the claim.

What I claim is:

The combination with a body in the shape of a cross of bearing means for each arm of the cross, such bearing means including a cup-shaped cap for each arm, said cap having an end face terminating short of the inner end of the arm to provide a clearance between such end face and the body, an elongated plastic bushing located between the arm and cap and being of such length as to project beyond said end face and overlap the clearance between the end face and body, said body being provided with a circular recess adjacent the inner end of each arm for receiving the projecting end of the bushing, each cup and circular recess having inclined side surfaces, and a sealing ring engaging each of said inclined side surfaces for biasing the projecting end of each bushing inwardly.

References Cited by the Examiner
UNITED STATES PATENTS

| | | | |
|---|---|---|---|
| 1,412,577 | 4/1922 | Smith | 64—17 |
| 1,997,488 | 4/1935 | Henry | 64—17 |
| 2,107,497 | 2/1938 | Padgett | 64—17 |
| 2,217,082 | 10/1940 | Swenson | 64—17 |
| 2,970,869 | 2/1961 | Thomas | 308 |
| 3,087,314 | 4/1963 | Jarvis et al. | 64—17 |

FOREIGN PATENTS 458,530   12/1936   Great Britain.

BROUGHTON G. DURHAM, Primary Examiner.
ROBERT C. RIORDON, Examiner.